No. 862,917. PATENTED AUG. 13, 1907.
T. A. HOOVER.
VEHICLE SPRING.
APPLICATION FILED JAN. 21, 1907.
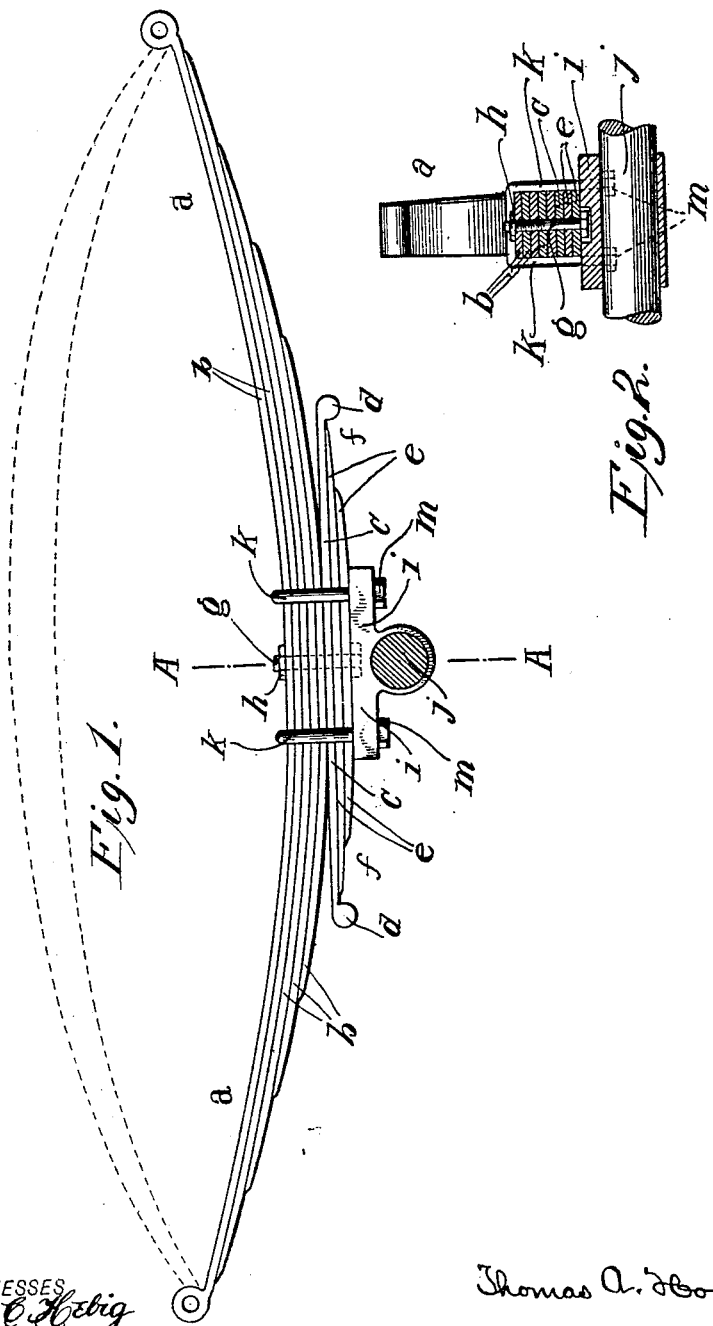
WITNESSES
Harry C. Hebig
Lillian Henson.
INVENTOR
Thomas A. Hoover
BY
James Hamilton
ATTORNEY

UNITED STATES PATENT OFFICE.

THOMAS A. HOOVER, OF FRESNO, CALIFORNIA.

VEHICLE-SPRING.

No. 862,917.  Specification of Letters Patent.  Patented Aug. 13, 1907.

Application filed January 21, 1907. Serial No. 353,256.

*To all whom it may concern:*

Be it known that I, THOMAS A. HOOVER, a citizen of the United States, residing at Fresno, in the county of Fresno and State of California, have invented certain new and useful Improvements in Vehicle-Springs, of which the following is a specification, reference being had to the accompanying drawings.

My invention relates to improvements in vehicle springs and particularly to that class of vehicle springs in which the main or regular spring is reinforced by an auxiliary spring.

One object of my invention is to provide a spring of the class described which will be comparatively cheap in manufacture, and strong to resist a strain due to an overload, without sacrificing resiliency under light loads.

In the drawings illustrating the principle of my invention and the best mode now known to me of applying that principle, Figure 1 shows a side elevation of a spring embodying my invention in its construction; and Fig. 2 is a sectional view on the line A A of Fig. 1.

The main or regular spring $a$ is made up in the usual way of several leaves $b$ each shorter than the one above it, so as to produce the common semi-elliptical shape. It will be understood that, as is shown in dotted lines in Fig. 1, an upper semi-elliptical member may be added to the lower semi-elliptical member $a$ to form a full elliptical spring, if so desired.

Beneath the lowermost leaf $b$ of the main semi-elliptical spring $a$ is mounted a plate $c$ of much less curvature than that of the lowermost leaf $b$ of the regular spring $a$. The plate $c$ is formed with the rounded ends $d$ which strengthen the extremities of the plate $c$ and adapts the latter to receive the blow of the lowermost leaf $b$, in case the main spring is subjected to a sudden and violent shock or stress. Beneath the plate $c$ are the leaves $e$; and the plate $c$ and the leaves $e$ constitute an auxiliary or reinforcing spring $f$ which will be brought into play in case of a violent shock or a severe stress.

The curved leaves $b$ of the main spring $a$ contact throughout their entire length each with the overlying leaf to form a separate spring; and the leaves $e$ and the plate $c$ (which is flat on top) form another separate spring, each leaf contacting with the one overlying it throughout its entire length. The main and auxiliary springs are entirely separate and distinct, the ends $d$ of the plate $c$ being separated by an interval of such size that the auxiliary spring is not brought into play until the main spring is subjected to great flexure.

The leaves of the auxiliary and main springs are bound together by a bolt $g$ and nut $h$. Beneath the lowermost leaf of the auxiliary spring $f$ is a spring block $i$ in which is mounted the axle end $j$ and which is secured to the springs by the clips $k$ and the nut $m$.

The plate $c$ touches the leaf $b$, only between the clips $k$, thus preserving the resiliency of the main spring. At the same time, in case of a violent shock or severe stress, the auxiliary spring will be brought into play and add to the resiliency and resisting power of the spring as a whole.

I claim:

A vehicle spring consisting of a main spring made up of a plurality of curved leaves, each shorter than the one which overlies it; an auxiliary spring consisting of a plate flat on top and lying beneath said main spring, and of a plurality of leaves beneath said plate, each shorter than said plate, and shorter than the overlying leaf; a spring-block beneath said auxiliary spring; and a pair of clips securing said spring-block and auxiliary and main springs together; said plate contacting with said main spring only between said clips and being separated at its ends from said main spring by a substantial interval, whereby said auxiliary spring is called into play only when the main spring is subjected to great flexure.

THOMAS A. HOOVER.

Witnesses:
F. E. COOK,
OLIVE GIBBS.